United States Patent
Algiene et al.

(10) Patent No.: US 7,309,003 B2
(45) Date of Patent: Dec. 18, 2007

(54) CREDIT CARD ACCOUNT PAYMENT SYSTEMS AND METHODS

(75) Inventors: Kenneth Algiene, Littleton, CO (US); Mark Wadsworth, Sparks, NV (US)

(73) Assignee: First Data Corporation, Greenwood Village, CO (US)

( * ) Notice: Subject to any disclaimer, the term of this patent is extended or adjusted under 35 U.S.C. 154(b) by 91 days.

(21) Appl. No.: 10/318,453

(22) Filed: Dec. 13, 2002

(65) Prior Publication Data

US 2004/0112952 A1   Jun. 17, 2004

(51) Int. Cl.
 G06Q 40/00 (2006.01)
 G07D 11/00 (2006.01)
 G07F 19/00 (2006.01)
(52) U.S. Cl. .................. 235/379; 235/375; 705/39
(58) Field of Classification Search ........ 235/379–381, 235/345, 487; 705/39, 77, 75, 17, 21, 34, 705/40–45; 902/2
See application file for complete search history.

(56) References Cited

U.S. PATENT DOCUMENTS

| | | | | |
|---|---|---|---|---|
| 5,283,829 A * | 2/1994 | Anderson | | 705/40 |
| 5,497,314 A * | 3/1996 | Novak | | 705/17 |
| 5,677,955 A * | 10/1997 | Doggett et al. | | 705/76 |
| 5,832,460 A * | 11/1998 | Bednar et al. | | 705/27 |
| 5,884,288 A * | 3/1999 | Chang et al. | | 705/40 |
| 5,946,669 A * | 8/1999 | Polk | | 705/40 |
| 6,041,315 A * | 3/2000 | Pollin | | 705/45 |
| 6,061,665 A * | 5/2000 | Bahreman | | 705/40 |
| 6,097,834 A * | 8/2000 | Krouse et al. | | 382/137 |
| 6,129,272 A * | 10/2000 | Yoshida et al. | | 235/379 |
| 6,164,528 A * | 12/2000 | Hills et al. | | 235/379 |
| 6,173,272 B1 * | 1/2001 | Thomas et al. | | 705/42 |
| 6,185,545 B1 * | 2/2001 | Resnick et al. | | 705/40 |
| 6,208,973 B1 * | 3/2001 | Boyer et al. | | 705/2 |
| 6,213,390 B1 * | 4/2001 | Oneda | | 235/379 |
| 6,282,522 B1 * | 8/2001 | Davis et al. | | 705/41 |
| 6,304,860 B1 * | 10/2001 | Martin et al. | | 705/43 |
| 6,353,811 B1 * | 3/2002 | Weissman | | 705/40 |
| 6,363,364 B1 * | 3/2002 | Nel | | 705/42 |
| 6,793,131 B2 * | 9/2004 | Hogan | | 235/379 |
| 6,865,592 B1 * | 3/2005 | Shindo | | 709/203 |
| 2001/0001148 A1* | 5/2001 | Martin et al. | | 705/39 |
| 2002/0013771 A1* | 1/2002 | Blackson et al. | | 705/43 |

(Continued)

OTHER PUBLICATIONS

Billpoint website: *Billpoint Buyer Guide: New to Billpoint?*, viewed Jul. 23, 2000, at <http://www.billpoint.com/help/index.html>, 2 pages.

(Continued)

*Primary Examiner*—Thien M. Le
*Assistant Examiner*—Edwyn Labaze
(74) *Attorney, Agent, or Firm*—Townsend and Townsend and Crew LLP

(57) ABSTRACT

In one embodiment, a method for making a payment on an account comprises reading account information from a payment instrument that identifies a customer account that is to receive a payment. A financial institution associated with the customer account is determined as well as a payment account that is associated with the financial institution where the payment is to be deposited. A payment amount is collected, and the payment amount is transmitted to the payment account of the financial institution.

33 Claims, 2 Drawing Sheets

U.S. PATENT DOCUMENTS

| | | | |
|---|---|---|---|
| 2002/0016769 A1* | 2/2002 | Barbara et al. | 705/40 |
| 2002/0077837 A1* | 6/2002 | Krueger et al. | 705/1 |
| 2002/0077969 A1* | 6/2002 | Walker et al. | 705/38 |
| 2002/0082962 A1* | 6/2002 | Farris et al. | 705/35 |
| 2002/0152124 A1* | 10/2002 | Guzman et al. | 705/16 |
| 2002/0169664 A1* | 11/2002 | Walker et al. | 705/14 |
| 2002/0169719 A1* | 11/2002 | Dively et al. | 705/40 |
| 2002/0198825 A1* | 12/2002 | Jentoft | 705/39 |
| 2003/0097332 A1* | 5/2003 | Golasinski et al. | 705/40 |
| 2003/0204457 A1* | 10/2003 | Arias | 705/30 |
| 2003/0216996 A1* | 11/2003 | Cummings et al. | 705/39 |
| 2003/0225705 A1* | 12/2003 | Park et al. | 705/64 |
| 2004/0111322 A1* | 6/2004 | Arias | 705/16 |
| 2004/0117302 A1* | 6/2004 | Weichert et al. | 705/40 |
| 2004/0230526 A1* | 11/2004 | Praisner | 705/40 |
| 2005/0240522 A1* | 10/2005 | Kranzley et al. | 705/40 |
| 2006/0085333 A1* | 4/2006 | Wah et al. | 705/40 |

OTHER PUBLICATIONS

Billpoint website: *Billpoint Buyer Guide: Buying*, viewed Jul. 23, 2000, at <http://www.billpoint.com/help/buyerguide/buying.html>, 3 pages.

Billpoint website: *Billpoint Buyer Guide: Managing Your Account*, viewed Jul. 23, 2000, at <http://www.billpoint.com/help/buyerguide/managing_account.html>, 1 page.

Billpoint website: *Billpoint Buyer Guide: Other*, viewed Jul. 23, 2000, at <http://www.billpoint.com/help/index.html>, 1 page.

Billpoint website: *Billpoint Seller Guide: New to Billpoint?*, viewed Jul. 23, 2000, at <http://www.billpoint.com/help/sellerguide/new.html>, 2 pages.

Billpoint website: *Billpoint Seller Guide: Accepting Payments/Issuing Refunds*, viewed Jul. 23, 2000, at <http://www.billpoint.com/help/index.html>, 5 pages.

Billpoint website: Billpoint Seller Guide: *Managing Your Account*, viewed Jul. 23, 2000, at <http://www.billpoint.com/help/sellerguide/managing_account.html>, 2 pages.

Billpoint website: *Billpoint Seller Guide: Policies/Other*, viewed Jul. 23, 2000, at <http://www.billpoint.com/help/index.html>, 2 pages.

i-Escrow website: *i-Escrow Secure Online Payments ebay: How it Works*, viewed Jul. 23, 2000; at <http://www.iescrow.com/ebay/>, 1 page.

i-Escrow website: *i-Escrow Secure Online Payments ebay: Overview*, viewed Jul. 23, 2000; at <http://www.iescrow.com/ebay/overview.html>, 1 page.

i-Escrow website: *i-Escrow Secure Online Payments ebay: What is i-Escrow?*, viewed Jul. 23, 2000; at <http://www.iescrow.com/ebay/whatisecrow.html>, 1 page.

i-Escrow website: *i-Escrow Secure Online Payments ebay: The Smart Way to Shop Online*, viewed Jul. 23, 2000; at <http://www.iescrow.com/ebay/service.html>, 1 page.

i-Escrow website: *i-Escrow Secure Online Payments ebay: Tutorial*, viewed Jul. 23, 2000; at <http://www.iescrow.com/ebay/step1>, 1 page.

i-Escrow website: *Escrow Secure Online Payments ebay: i-Escrow's Capabilities*, viewed Jul. 23, 2000; at <http://www.iescrow.com/ebay/capabilities.html>, 1 page.

i-Escrow website: *i-Escrow Secure Online Payments ebay: Usage Questions*, viewed Jul. 23, 2000; at <http://www.iescrow.com/ebay/usefaq.html>, 2 pages.

i-Escrow website: *i-Escrow Secure Online Payments ebay: Financial Questions*, viewed Jul. 23, 2000; at <http://www.iescrow.com/ebay/faq.html>, 1 page.

i-Escrow website: *i-Escrow Secure Online Payments ebay: Shipping and Receiving Requirements*, viewed Jul. 23, 2000; at <http://www.iescrow.com/ebay/faq.html>, 2 pages.

i-Escrow website: *i-Escrow Secure Online Payments ebay: Safe Online Transactions*, viewed Jul. 23, 2000; at <http://www.iescrow.com/ebay/>, 1 page.

Paymybills website: paymybills.com: *How the Service Works*, viewed Jul. 23, 2000; at <http://www.paymybils.com/demo/demoin.html>, 1 page.

Paymybills website: paymybills.com: *Guided Demo*, viewed Jul. 23, 2000; at <http://www.paymybills.com/demo/demo1_1.html>, 6 pages.

Paymybills website: paymybills.com: *Overview*, viewed Jul. 23, 2000; at <http://www.paymybills.com/howitworks.html>, 1 page.

Paymybills website: paymybills.com: *Features/Pricing*, viewed Jul. 23, 2000; at <http://www.paymybills.com/benefits.html>, 2 pages.

Paymybills website: paymybills.com: *Benefits*, viewed Jul. 23, 2000; at <http://www.paymybills.com/benefits.html>, 1 page.

Paymybills website: paymybills.com: *Getting Started*, viewed Jul. 23, 2000; at <http://www.paymybills.com/gettingstarted.html>, 1 page.

Paymybills website: paymybills.com: *Help Center*, viewed Jul. 23, 2000; at <http://www.paymybills.com/pressroom.html>, 2 pages.

Paymybills website: paymybills.com: *Interactive Demo*, viewed Jul. 23, 2000; at <http://www.paymybills.com/demo/idemo.html>, 1 page.

Paymybills website: paymybills.com: *FAQ*, viewed Jul. 23, 2000; at <http://www.paymybills.com/faq.html>, 3 pages.

PayPal website: *Paypal: Send and Request Money*, viewed Jul. 23, 2000; at <http://www.paypal.x.com/cgi-gin/webscr?cmd=p/ems/index-outside.html>, 3 pages.

PayPal website: *Paypal: About PayPal Payments*, viewed Jul. 23, 2000; at <http://www.paypal.x.com/cgi-gin/webscr?cmd=p/gen/uses-outside.html>, 1 page.

PayPal website: *Paypal: Auction Tools*, viewed Jul. 23, 2000; at <http://www.paypal.x.com/cgi-gin/webscr?cmd=p/auc/why-outside.html>, 1 page.

PayPal website: *Paypal: Why Use PayPal & Compare PayPal and Billpoint*, viewed Jul. 23, 2000; at <http://www.paypal.x.com/cgi-gin/webscr?cmd=p/auc/billpoint-chart-outside.html>, 2 pages.

PayPal website: *Paypal: How It Works*, viewed Jul. 23, 2000; at <http://www.paypal.x.com/cgi-gin/webscr?cmd=p/auc/auction-business-tools-outside.html>, 2 pages.

PayPal website: *Paypal: Business Tools for Auctions*, viewed Jul. 23, 2000; at <http://www.paypal.x.com/cgi-gin/webscr?cmd=p/acu/withdraw-outside.html>, 1 page.

PayPal website: *Paypal: Withdrawing Money*, viewed Jul. 23, 2000; at <http://www.paypal.x.com/cgi-gin/webscr?cmd=p/acu/logo-outside.html>, 1 page.

PayPal website: *Paypal: Which Account Type is Right for You?*, viewed Jul. 23, 2000; at <http://www.paypal.x.com/html>, 1 page.

PayPal website: *Paypal: Batch Pay Overview*, viewed Jul. 23, 2000; at <http://www.paypal.x.com/cgi-gin/webscr?cmd=p/gen/batch-benefits-outside.html>, 2 pages.

PayPal website: *Paypal: Batch Pay- How it works*, viewed Jul. 23, 2000; at <http://www.paypal.x.com/cgi-gin/webscr?cmd=p/gen/batch-works-outside.html>, 1 page.

PayPal website: *Paypal: Batch File Format*, viewed Jul. 23, 2000; at <http://www.paypal.x.com/cgi-gin/webscr?cmd=p/gen/batch-format-outside.html>, 1 page.

PayPal website: *Paypal: Batch Pay- Accounting*, viewed Jul. 23, 2000; at <http://www.paypal.x.com/cgi-gin/webscr?cmd=p/gen/batch-accounting-outside.html>, 1 page.

PayPal website: *Paypal: Batch Pay Support*, viewed Jul. 23, 2000; at <http://www.paypal.x.com/cgi-gin/webscr?cmd=p/gen/batch-support-outside.html>, 1 page.

PayPal website: *Paypal: Mobile Payments*, viewed Jul. 23, 2000; at <http://www.paypal.x.com/cgi-gin/webscr?cmd=p/gen/mobile-outside.html>, 1 page.

Pay me.com website: Pay me.com: *Give money. Get money, Fast and FREE!*, viewed Jul. 23, 2000; at <http://www.payme.com>, 1 page.

Pay me.com website: Pay me.com: *Company info*, viewed Jul. 23, 2000; at <http://www.payme.com/public/companyinfo_about us_none.html>, 1 page.

Pay me.com website: Pay me.com: *Services: Pay anyone with an e-mail address*, viewed Jul. 23, 2000; at <http://www.payme.com/public/services_sendmoney_none.html>, 1 page.

Pay me.com website: Pay me.com: *Services: Receive personal payments online*, viewed Jul. 23, 2000; at <http://www.payme.com/public/services_requestmoney_none.html>, 1 page.

Pay me.com website: Pay me.com: *Services: Buy or sell items quickly*, viewed Jul. 23, 2000; at <http://www.payme.com/public/services_auctions_none.html>, 1 page.

Pay me.com website: Pay me.com: *Services: File your transactions online*, viewed Jul. 23, 2000; at <http://www.payme.com/public/services_getorganized_none.html>, 1 page.

Pay me.com website: Pay me.com: *Services: Easy to join and easy to use*, viewed Jul. 23, 2000; at <http://www.payme.com/public/services_gettingstarted_none.html>, 1 page.

Pay me.com website: Pay me.com: *Help: The five most common questions*, viewed Jul. 23, 2000; at <http://www.payme.com/public/help_faq_none.html>, 1 page.

Pay me.com website: Pay me.com: *Help: General*, viewed Jul. 23, 2000; at <http://www.payme.com/public/help_general_none.html>, 1 page.

Pay me.com website: Pay me.com: *Help: Becoming a Member*, viewed Jul. 23, 2000; at <http://www.payme.com/public/help_becomingamember_none.html>, 1 page.

Pay me.com website: Pay me.com: *Help: Sending Money*, viewed Jul. 23, 2000; at <http://www.payme.com/public/help_sendpayment_none.html>, 1 page.

Pay me.com website: Pay me.com: *Help: Requesting Money*, viewed Jul. 23, 2000; at <http://www.payme.com/public/help_requestpayment_none.html>, 1 page.

Pay me.com website: Pay me.com: *Help: Auctions*, viewed Jul. 23, 2000; at <http://www.payme.com/public/help_auctions_none.html>, 2 pages.

eMoneyMail website: *eMoneyMail: Welcome to eMoney Maill!*, viewed Jul. 23, 2000; at <http://www/emoneymail.com/>, 1 page.

eMoneyMail website: *eMoneyMail: About eMoney Mail*, viewed Jul. 23, 2000; at <http://www/emoneymail.com/Default.asp?WCI=about>, 3 pages.

eMoneyMail website: *eMoneyMail: Security Statement*, viewed Jul. 23, 2000; at <http://www/emoneymail.com/Default.asp?WCI=Security>, 1 page.

eMoneyMail website: *eMoneyMail: Frequently Asked Questions*, viewed Jul. 23, 2000; at <http://www/emoneymail.com/Default.asp?WCI=FAQ>, 10 pages.

ecount website: *ecount: Welcome to ecount.com*, viewed Jul. 23, 2000; at <http://www.ecount.com>, 1 page.

ecount website: *ecount: About Us*, viewed Jul. 23, 2000; at <http://www.ecount.com/aboutus.asp>, 1 page.

ecount website: *ecount: Learn More*, viewed Jul. 23, 2000; at <http://www.ecount.com/learnmore.asp>, 3 pages.

ecount website: *ecount: Help Desk FAQs*, viewed Jul. 23, 2000; at <http://www.ecount.com/faq.asp>, 10 pages.

Tradesafe.com website: tradesafe.com: *e-commerce for everyone*, viewed Jul. 23, 2000; at <http://www.tradesafe.com>, 1 page.

Tradesafe.com website: tradesafe.com: *The comany*, viewed Jul. 23, 2000: at <http://www.tradesafe.com/index.cfm>, 2 pages.

Tradesafe.com website: tradesafe.com: *Welcome to Tradesafe Payments!*, viewed Jul. 23, 2000: at <http://www.tradesafe.com/howitworks.cfm>, 1 page.

Tradesafe.com website: tradesafe.com: *How Tradesafe Payments Works*, viewed Jul. 23, 2000: at <http://www.tradesafe.com/tspworks.cfm>, 1 page.

Tradesafe.com website: tradesafe.com: *The Tradesafe Payments Gurantee*, viewed Jul. 23, 2000: at <http://www.tradesafe.com/tspguarantee,cfm>, 1 page.

Tradesafe.com website: tradesafe.com: *Seller's Guide*, viewed Jul. 23, 2000: at <http://www.tradesafe.com/tspseller.cfm>, 1 page.

Tradesafe.com website: tradesafe.com: *Buyer's Guide*, viewed Jul. 23, 2000: at <http://www.tradesafe.com/tspbuyer.cfm>, 1 page.

Tradesafe.com website: tradesafe.com: *Using FastView*, viewed Jul. 23, 2000: at <http://www.tradesafe.com/fastview.cfm>, 1 page.

Tradesafe.com website: tradesafe.com: *Transactions over $1200*, viewed Jul. 23, 2000: at <http://www.tradesafe.com/tsp1200.cfm>, 1 page.

Tradesafe.com website: tradesafe.com: *Policies & Procedures*, viewed Jul. 23, 2000: at <http://www.tradesafe.com/tspfine.cfm>, 3 pages.

Tradesafe.com website: tradesafe.com: *Tradesafe FAQs- Being a Seller*, viewed Jul. 23, 2000: at <http://www.tradesafe.com/faq.cfm>, 3 pages.

Tradesafe.com website: tradesafe.com: *Tradesafe FAQs- Being a Buyer*, viewed Jul. 23, 2000: at <http://www.tradesafe.com/faqbuyer.cfm>, 2 pages.

* cited by examiner

CREDIT CARD ACCOUNT PAYMENT SYSTEMS AND METHODS

BACKGROUND OF THE INVENTION

This invention relates generally to the field of payments, and in particular to payments on an financial account. In one specific aspect, the invention relates to the payment of a credit card account.

Traditionally, companies that provide goods or services typically bill their customers on a regular basis. Such bills are typically printed onto paper and then mail to the customer. The customer may then return the payment in the mail. This payment is typically by check or money order, although recently some companies will accept credit card payments.

With the advent of the Internet, a variety of electronic bill payment services have become available. Such services typically require a customer to provide information on the accounts that are to be serviced. The bill payment service is then able to arrange with the biller the transfer of bill data. This bill data is organized and provided to the customer on a web page so that the customer may authorize payment.

Another type of bill payment service is the Western Union Convenience Pay® service that permits utility bills to be paid at an agent location. To pay the bill, the customer provides a bill statement and cash to make the payment. Western Union collects the money, enters the account information from the bill statement into a terminal and then makes the payment electronically through their money transfer system.

This invention is related payments made on a financial account, such as a credit card account. As described below, the invention provides various methods and systems to facilitate such payments.

BRIEF SUMMARY OF THE INVENTION

The invention provides various methods, devices and systems to facilitate the payment of an account. According to one method, account information is read from a payment instrument, such as a credit card, debit card, ATM card, or the like. The account information that is read from the payment instrument includes a customer account that is to receive a payment. Either before or after the information is read from the payment instrument, the customer may be asked (or may select on his own) whether a payment is to be made on the customer's account. If so, the account information may be transmitted to a host computer system to determine a financial institution that is associated with the customer account. A determination may also be made as to a payment account that is associated with the financial institution where the payment is to be deposited. A payment amount may also be collected, and the payment amount transmitted to the payment account of the financial institution. Hence, a customer may conveniently make a payment on an account simply by providing a payment instrument and a payment.

For example, the payment instrument may have its account information read electronically using a reader of a processing device, such as a point of sale terminal, financial kiosk or the like. If the customer wishes to make a payment, the customer may provide the payment amount to a customer service representative, to the processing device, or the like. For instance, the payment may be made in cash, by check, by another type of payment instrument, or the like.

One example of how to inquire as to whether a payment is to be made is by displaying a query at the processing device after the presentation instrument has been read. The processing device may also receive back from the host computer system information on the amount of payment that is due. This information may be displayed to the customer to help the customer in deciding how much to pay. The processing device may also display various options for paying and associated fees. For example, such options may include same day payment, one-day payment, three-day payment or the like. Following payment, the processing device may produce a file that is used to print a receipt indicating that the payment amount has been paid on the customer account.

The host computer system may also produce a record of the payment and transmit the record to the financial institution so that the customer's records may be updated. Conveniently, the payment may be electronically transferred in a variety of ways. For example, when collecting a cash payment or making a same day payment, the funds may be transferred from a host account to the payment account. In other cases, such as when accepting a credit card or debit card as a form of payment, the payment may be transferred directly from an account of the customer to the payment account.

In one aspect, the financial institution may be determined by performing a look up in a table having ranges of customer account numbers and associated financial institutions. In a similar manner, the payment account may be determined by performing a look up in a table having financial institutions and associated payment accounts.

In another embodiment, the invention provides a payment system that comprises a host computer system having at least one input interface and at least one output interface. The input interface is adapted to receive account information that identifies a customer account that is to receive a payment and a payment amount. Further, the host computer system is configured to determine a financial institution associated with the customer account and a payment account that is to receive the payment. The output interface is adapted to transmit a request to electronically transfer the payment amount to the payment account.

Conveniently, the host computer system may include a table having ranges of customer account numbers and associated financial institutions. The host computer system may also include a table having financial institutions and associated payment accounts. In one aspect, the host computer system may be configured to transmit a request to the financial institution for payment information on the customer account.

In yet another embodiment, the invention provides a presentation instrument processing system that comprises a processor, a reader that is coupled to the processor and is configured to read a customer account from a presentation instrument, a data entry device, a display screen, and an output interface. The display screen is configured to display a query as to whether a payment is to be made toward the customer account upon reading of the customer account from the presentation instrument. Further, the data entry device is configured to permit a payment amount to be entered, and the output interface is configured to transmit the customer account and the payment amount to a host computer system to permit the payment to be made. A printer may be coupled to the processor for printing receipts.

DETAILED DESCRIPTION OF THE INVENTION

Figure 1:
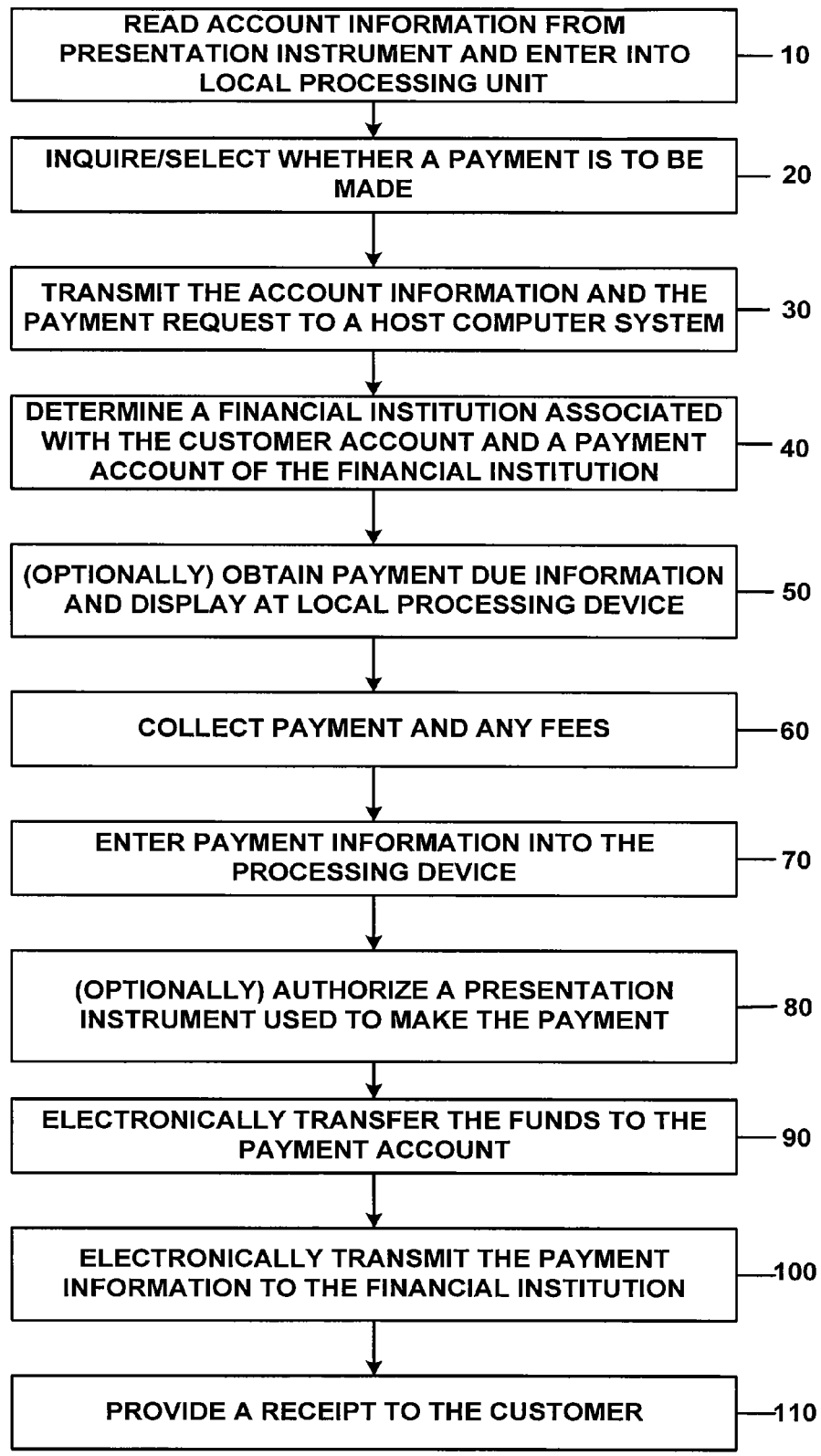
FIG. 1 is a flow chart illustrating one method for making a payment on an account according to the invention.

The invention provides equipment, systems and techniques to facilitate a payment made on an account. Such accounts are typically associated with a presentation instrument that has information on the account, such as the account number, the customer's name, an expiration date, and the like. Examples of such presentation instruments include credit cards, charge cards, debit cards, and the like. The account information may be stored on the presentation instruments in a variety of ways, such as by printing or embossing, by a magnetic stripe, by a smart chip or processor, and the like. As such, a wide variety of devices may be used to read the account information, including point of sale devices, such as those described in U.S. application Ser. No. 10/116689, filed Apr. 3, 2002 (the complete disclosure of which is herein incorporated by reference), financial kiosks, such as described in copending U.S. application Ser. No. 10/225,410, filed Aug. 20, 2002 (the complete disclosure of which is herein incorporated by reference), and the like. These may have magnetic stripe readers, smart card readers, and the like. In some cases, the information may be read from the card by a customer service representative and entered into a processing device.

According to the invention, payments may be made on such accounts at any time, such as after receiving a statement, to increase a credit line, to make a spontaneous payment, or the like. One advantage of the invention is that a statement is not needed to make a payment, although one may be used. To make a payment, account information may be read from the presentation instrument and subsequently used to obtain information such as the financial institution associated with the customer's account, a payment account of the financial institution, payment due information, and the like. This information may be obtained by performing one or more look up routines in a database. For example, the BIN numbers of a credit card may be used to determine the financial institution that is associated with the account as described in PCT Publication No. WO 01/04846, Jan. 18, 2001, the complete disclosure of which is herein incorporated by reference. Another look up may be performed to determine a payment account associated with the financial institution. In some cases, it may be possible to simply associate an account number with a payment account. Such data may be stored at a host computer system or at the local processing device if it has sufficient memory.

When collecting the payment, a variety of payment forms may be used. For example, payments may be made in cash, by check, by money order or the like. As another example, the customer may even use another payment instrument, such as a credit or debit card. To facilitate such payment types, the funds may be electronically transferred through a payment network, either directly from an account of the customer or from a host account. A file having a record of the payment may also be transmitted to the financial institution to permit the customer's account to be updated.

Referring now to FIG. 1, one method for making a payment on an account will be described. To make a payment on an account, the method reads the account information from a presentation instrument as illustrated in step 10. This may be read manually by a customer service representative and entered into a local processing unit, or may be read electronically from the payment instrument by the local processing unit. In some cases, the account information may be read from another source, such as from a statement.

During the process, the customer is asked whether a payment on the account is to be made as shown in step 20. This may be done either before or after the account information is read. For example, the customer may approach a customer service representative and ask to make a payment, or may select a payment option from a point of sale device or kiosk prior to providing any account information. As another example, the presentation instrument may be read by a point of sale device. Upon recognition by the point of sale device that the presentation instrument has an associated account, a query may be displayed asking whether a payment is to be made on the account. A YES/NO response may then be entered into the point of sale device.

After the account information has been read and a request to make the payment has been made, the account information is transmitted to a host computer system as shown in step 30 (although in some cases, the account information may be transmitted to the host computer system even before asking whether a payment is to be made). The host computer system uses the account information to determine a financial institution associated with the customer account and a payment account that is associated with the financial institution as illustrated in step 40. The financial institution may be determined using a look up table having ranges of BIN numbers and associated financial institutions, although other tables are possible. A look up table having financial institutions and their associated deposit accounts may also be included so that the payment account may be determined.

As shown in step 50, the process may optionally provide the customer with payment due information that is displayed at the local processing device. This information may be obtained by transmitting a request from the host computer system to a computer system of the financial institution, or by storing the payment due information at the host computer system if previously provided by the financial institution. In this way, a display may be provided to the customer with information such as the total payment due, the payment due date, a minimum payment amount, and the like.

The method also includes the step of collecting the payment and any associated fees as shown in step 60. Conveniently, any fees that are due may be displayed to the customer using the local processing device. Further, the customer may have the option of choosing various payment options, with different fees associated with each option. These options may also be displayed at the local processing device. For example, to deposit a payment within one day may incur a certain fee while a payment that is deposited within three days may incur a lesser fee. The fees and timing of deposit may also vary depending on the type of payment. Examples of payment types include payments made in cash, by check, by money order, by debit card, by credit card, or the like. The payment information, including the payment option and form of payment, is entered into the local processing device and then transmitted to the host computer system as illustrated in step 70.

Some forms of payment, such as ATM debits and credit card payments, may need to go through an authorization process before accepting the payment as shown in step 80. For example, after transmitting the payment information to the host computer system, the host computer system may transmit an authorization request to credit card organizations and/or financial institutions to insure that sufficient funds are available to make the payment. Such authorization techniques are known within the art and will not be described further.

As shown in step 90, the funds are electronically transferred to the payment account. In the case where cash payments are made, the funds may be electronically transmitted from a custody or host account to the payment account of the financial institution. The custody or host account may be credited based on the payment collected. For other types of payments, such as debit card, credit cards, and checks, the payments may be made from the account associated with the payment instrument to the payment account. In some cases, such payments may be delayed several days. In such cases, the customer may request a faster payment option. To accomplish such requests, the payment may be made from the host account, and the host account may be credited once funds are received from the debit, credit or checking account.

In addition to electronically transferring the payment, a file containing the payment information may be electronically transmitted to the financial institution as illustrated in step 100. In this way, the financial institution may update its customer records. A receipt may also be printed and provided to the customer as illustrated in step 110. This may conveniently be performed by transmitting a print file from the local processing device to a printer which prints the receipt.

Figure 2:
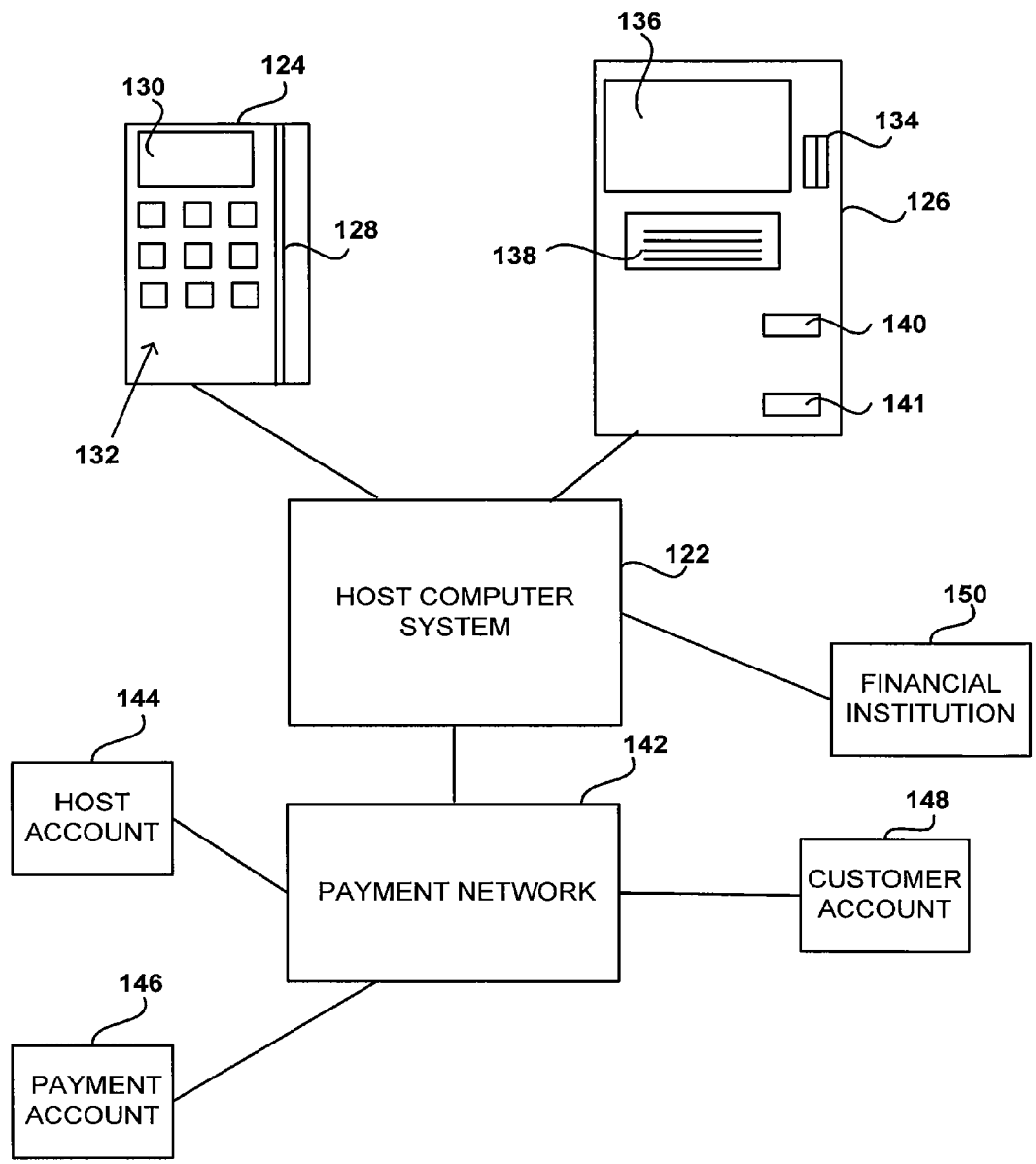
FIG. 2 is a schematic diagram of a payment system according to the invention.

Referring now to FIG. 2, one system 120 that may be used to make payments on an account will be described. For example, the methods described in connection with FIG. 1 may be implemented using system 120. Central to system 120 is a host computer system 122. Host computer system 122 may comprise one or more computers having one or more memory devices and/or databases. Host computer system may also include various interfaces to facilitate communication with various other computer systems. For example, requests to make payments on accounts may be received from various local processing devices, such as a point of sale device 124 or a financial kiosk 126. Point of sale device 124 may include a reader 128 for reading account information from a payment instrument. For example, reader 128 may comprise a magnetic stripe reader. Point of sale device 124 may be configured to process debit and credit forms of payment as is known in the art.

Point of sale device 124 also includes a display screen 130 for displaying various information to the customer and/or operator. Point of sale device 124 further includes an entry device 132, such as a keypad. Display screen 130 may be used to ask the customer whether a payment is to be made on the account once payment information is read using reader 128. A response to this question may be displayed on screen 130. Alternatively, keypad 132 may be used to enter payment information. Display screen 130 may also be used to display other information, such as payment options and associated fees, acceptable payment types, payment due information (as transmitted from host computer system 122), and the like.

Kiosk 126 also includes a reader 134, a display screen 136 and a keypad 138. These may function similar to those found in point of sale device 124. Kiosk 140 may also have a deposit bin for receiving a deposit of funds (such as cash or checks) that are to be used in making the payment. Kiosk 126 may also be used to facilitate other financial transaction as is known in the art, such as ATM withdrawals, deposits, and transferring funds. Kiosk 126 may also include a printer 141 for printing receipts for the customer.

Host computer system 122 may include various look up tables or other databases to permit a payment account of a financial institution to be associated with a payment from a customer. This may be accomplished by accessing one or more tables or performing one or more database searches to determine an appropriate payment account for a customer account.

When ready to make a payment, host computer system 122 facilitates the electronic funds transfer. This is generally accomplished using a payment network 142. In cases where payment is received by cash, or where a rapid payment needs to be made, the payment may be made from a host account 144. For example, an electronic funds transfer may be made from host account 144 directly into payment account 146. The host account 144 may subsequently be credited with the payment received at the point of sale or from a customer account 148. In other cases, the customer may desire the payment to be made from his customer account 148 directly into the payment account 146. This may be a PIN-less debit, a PIN debit, an ACH transfer, a credit card payment, or the like. In some cases, payment network 142 may include systems operated by credit card associations, such as VISA or MASTERCARD, to facilitate authorization and settlement of the payment.

Host computer system 122 may also transmit to and receive files from a financial institution 150. For example, host computer system 122 may receive information from financial institution 150 on its payment account, on specific customer accounts (such as payment due information), and the like. Host computer system 122 may transmit to financial institution 150 records on payments made to payment account 146 so that the customer's payment information may be updated.

The invention has now been described in detail for purposes of clarity and understanding. However, it will be appreciated that certain changes and modifications may be practiced within the scope of the appended claims.

What is claimed is:

1. A method for making a payment on a financial account, the method comprising:

reading, at a point-of-service (POS) device, financial account information from a payment instrument that identifies a customer financial account that is to receive a payment, wherein the payment instrument is selected from the group consisting of credit cards, charge cards, and debit cards;

determining a financial institution associated with the customer financial account;

determining a payment account associated with the financial institution where the payment is to be deposited;

receiving, from a host computer system, a current amount due in relation to the customer financial account as identified from the payment instrument;

displaying on the POS device a query as to whether a payment is to be made on the customer financial account;

entering into the POS device an indication that the payment is to be made;

collecting a payment amount, wherein the payment amount is at least a portion of the current amount due; and transmitting the payment amount to the payment account of the financial institution;

wherein the financial account information is electronically read from the payment instrument using an automatic payment instrument reader of the POS device.

2. The method as in claim 1, further comprising inquiring as to whether a payment is to be made on the customer financial account after reading the financial account information.

3. The method as in claim 2, wherein the inquiry as to whether a payment is to be made is generated by producing and displaying the query at the POS device.

4. The method as in claim 1, further comprising printing a receipt indicating that the payment amount has been paid on the customer financial account.

5. The method as in claim 1, further comprising displaying the current amount due at the POS device.

6. The method as in claim 1, further comprising displaying at the POS device various payment options for making the payment.

7. The method as in claim 1, wherein the payment is collected in cash.

8. The method as in claim 1, wherein the payment is collected by obtaining an authorization to charge or debit another financial account.

9. The method as in claim 1, wherein the POS device is selected from the group consisting of: a point of sale terminal, a financial kiosk, and an automated teller machine.

10. A method for making a payment on a financial account, the method comprising:

reading financial account information electronically from a payment instrument using an automatic payment instrument reader of a point-of-sale (POS) device, wherein the financial account information identifies a customer financial account that is to receive a payment, the payment instrument comprising one of a credit card, a debit card, or a charge card;

receiving, from a host computer system, a current amount due in relation to the customer financial account as identified from the payment instrument;

inquiring as to whether a payment is to be made on the customer financial account;

displaying, in response to the inquiry, on the POS device a query as to whether the payment is to be made on the customer financial account;

entering into the POS device an indication that the payment is to be made;

entering a payment amount into the POS device;

collecting the payment amount, wherein the payment amount is at least a portion of the current amount due; and transmitting the financial account information and the payment amount to the host computer system.

11. The method as in claim 10, further comprising printing a receipt indicating that the payment amount has been paid on the customer financial account.

12. The method as in claim 10, wherein the financial account information is read from the payment instrument using a magnetic stripe reader.

13. The method as in claim 10, wherein the inquiry as to whether a payment is to be made is generated by producing and displaying the query at the POS device.

14. The method as in claim 13, wherein the query is produced and displayed in response to reading the financial account information from the payment instrument.

15. The method as in claim 10, wherein the inquiry as to whether a payment is to be made is made verbally by a service representative.

16. The method as in claim 10, further comprising receiving and displaying the current payment due information at the POS device.

17. The method as in claim 10, further comprising displaying at the POS device various payment options for making the payment.

18. The method as in claim 10, wherein the payment is collected in cash.

19. The method as in claim 10, wherein the payment is collected by obtaining an authorization to charge or debit another financial account.

20. The method as in claim 10, further comprising receiving at the POS device from the host computer system a confirmation that the information on the payment amount was received.

21. A method for making a payment on a financial account, the method comprising:

receiving at a point-of-service (POS) device financial account information that identifies a customer financial account that is to receive a payment and a payment amount, the financial account information electronically read from a presentation instrument using an automatic presentation instrument reader of the POS device, the customer financial account comprising one of a debit account, a credit card account, and a charge card account;

receiving from the POS device a current payment due information in relation to the customer financial account, wherein the payment amount is at least a portion of an amount indicated by the current payment due information;

determining at the POS device a financial institution associated with the customer financial account and a payment account that is to receive the payment as identified from the presentation instrument;

displaying on the POS device a query as to whether a payment is to be made on the customer financial account;

entering into the POS device an indication that the payment is to be made; and transmitting a request from the POS device to electronically transfer the payment amount to the payment account.

22. The method as in claim 21, further comprising determining the current payment due information on the customer financial account and transmitting the current payment due information to the POS device.

23. The method as in claim 21, further comprising producing a record of the payment and transmitting the record to the financial institution.

24. The method as in claim 21, wherein the request to electronically transfer the funds comprises an electronic funds transfer from a host account to the payment account.

25. The method as in claim 21, wherein the request to electronically transfer the funds comprises an electronic transfer from a second customer account to the payment account.

26. The method as in claim 25, wherein the second customer account is selected from a group of accounts consisting of a checking account, a debit account, a credit card account, a savings account, and an investment account.

27. The method as in claim 21, wherein the financial institution is determined by performing a look up in a table having ranges of customer financial account numbers and associated financial institutions.

28. The method as in claim 21, wherein the payment account is determined by performing a look up in a table having financial institutions and associated payment accounts.

29. A payment system, comprising:

a point-of-service (POS) device having at least one input interface, at least one output interface, and a table having ranges of customer financial account numbers and associated financial institutions, wherein the input interface is adapted to receive financial account information that identifies a customer financial account that is to receive a payment and a payment amount, the financial account information electronically read from a presentation instrument by an automatic presentation instrument reader of a POS device, and wherein the POS device is configured to determine a financial institution associated with the customer financial account using the table, to determine a payment account that is to receive the payment and a current amount due in relation to the payment account as read from the presentation instrument, to display on the POS device a query as to whether a payment is to be made on the customer financial account, to enter into the POS device an indication that the payment is to be made and wherein the output interface is adapted to transmit a request to electronically transfer the payment amount from the POS device to the payment account.

30. The system as in claim 29, wherein the POS device includes a table having financial institutions and associated payment accounts.

31. The system as in claim 29, wherein the POS device is configured to transmit a request to the financial institution for payment information on the customer financial account.

32. A presentation instrument processing system, comprising:

a processor;

a host computer system;

a point-of-sale (POS) device that is coupled to the processor and is configured to electronically read a customer financial account from one of a credit card, a debit card, or a charge card;

a data entry device coupled to the POS device configured to enter into the POS device an indication that a payment is to be made;

a display screen coupled to the POS; and an output interface coupled to the POS device;

wherein the display screen is configured to display a query as to whether a payment is to be made toward the customer financial account upon reading of the customer financial account from the presentation instrument, and to display a current payment due amount, wherein the data entry device is configured to permit a payment amount to be entered, and wherein the output interface is configured to transmit the customer financial account and the payment amount to the obtained from the presentation instrument, and wherein the is configured to determine the current payment amount due.

33. The system as in claim 32, further comprising a printer that is coupled to the processor for printing receipts.

* * * * *